United States Patent [19]

Danno

[11] Patent Number: 4,585,101
[45] Date of Patent: Apr. 29, 1986

[54] POWER TRANSMISSION MECHANISM FOR AUTOMOTIVE VEHICLES

[75] Inventor: Yoshiaki Danno, Kyoto, Japan

[73] Assignee: Mitsubishi Jidosha Kogyo Kabushiki Kaisha, Tokyo, Japan

[21] Appl. No.: 729,090

[22] Filed: May 2, 1985

Related U.S. Application Data

[63] Continuation of Ser. No. 359,890, Mar. 19, 1982.

[30] Foreign Application Priority Data

Mar. 23, 1981 [JP] Japan .................................. 56-40447
Feb. 10, 1982 [JP] Japan .................................. 57-20462

[51] Int. Cl.⁴ .......................................... B60K 41/02
[52] U.S. Cl. .................................... 192/3.31; 74/732; 123/90.16; 123/90.27; 123/198 F; 192/3.58
[58] Field of Search ............. 123/198 F, 90.15, 90.16, 123/90.27, 481; 74/732; 192/0.033, 0.076, 3.31, 3.58, 3.56

[56] References Cited

U.S. PATENT DOCUMENTS

| | | | |
|---|---|---|---|
| 3,541,893 | 11/1970 | Dyke et al. | 74/864 |
| 3,805,640 | 4/1974 | Schneider et al. | 192/3.31 X |
| 4,027,554 | 6/1977 | Ito et al. | 192/3.31 X |
| 4,056,177 | 11/1977 | Ahlen et al. | 192/3.31 X |
| 4,061,055 | 12/1977 | Iizuka et al. | 123/198 F X |
| 4,090,417 | 5/1978 | Burcz et al. | 74/732 X |
| 4,129,109 | 12/1978 | Matsumoto | 123/198 F |
| 4,144,863 | 3/1979 | Abdoo | 123/198 F |
| 4,188,933 | 2/1980 | Iizuka | 123/198 F |
| 4,200,081 | 4/1980 | Meyer et al. | 123/198 F |
| 4,227,505 | 10/1980 | Larson et al. | 123/198 F |
| 4,249,489 | 2/1981 | Brader et al. | 123/90.16 |
| 4,284,042 | 8/1981 | Springer | 123/198 F |
| 4,337,740 | 7/1982 | Sugasawa et al. | 123/198 F |
| 4,354,471 | 10/1982 | Sugasawa et al. | 123/198 F X |
| 4,431,095 | 2/1984 | Suga | 192/3.31 |

FOREIGN PATENT DOCUMENTS

151230 11/1981 Japan .

Primary Examiner—Kenneth J. Dorner
Assistant Examiner—Dwight G. Diehl

[57] ABSTRACT

A power transmission mechanism for automotive vehicles comprises a variable displacement engine which can be selectively shifted from the driving with all cylinders to the driving with a limited number of cylinders by changing the number of cylinders in operation. A torque transmission is interposed between an output shaft and a driven shaft of the engine which can selectively use either a fluid coupling or a direct coupling. A control unit selects the driving state of the variable displacement engine and a coupling of the torque transmission depending on the driving ranges of the variable displacement engine as well as the automotive vehicle.

5 Claims, 7 Drawing Figures

POWER TRANSMISSION MECHANISM FOR AUTOMOTIVE VEHICLES

This application is a continuation, of application Ser. No. 359,890, filed Mar. 19, 1982.

BACKGROUND OF THE INVENTION

The present invention relates to a power transmission mechanism for automotive vehicles.

There has been known in the field of multi-cylinder engines a type of variable displacement engine which can either actuate all the cylinders or suspend a part of the cylinders, or, in other words, to stop them to rest depending on driving conditions. Such variable displacement engines aim at cutting down the fuel consumption under the low-load driving range but undesirable shock tends to be caused at the time of shifting the number of cylinders in such an arrangem:ent. There has also been used in practice for internal combustion engines a system which is provided with both a fluid coupling means such as a fluid clutch, a torque converter, etc. and a direct coupling clutch as the torque transmission system in order to increase the fuel/mileage rate as well as the drivability.

BRIEF SUMMARY OF THE INVENTION

The present invention aims to provide a power transmission mechanism for automotive vehicles which is advantageous in the fuel consumption as well as in the drivability by organically combining a variable displacement engine and a torque transmission mechanism provided with a fluid coupling and a direct coupling clutch. More particularly it aims at providing an automotive vehicle having a variable displacement engine and a torque transmission means therefor wherein a fluid coupling means and a direct coupling means can be selectively used, which is capable of reducing the shock encountered at the time of shifting the number of operating cylinders, and of selectively employing a torque transmission means most suitable for the driving state of the vehicle with the construction mentioned above so as to increase the fuel economy and the drivability.

In order to attain above mentioned purposes, the mechanism according to the present invention comprises a variable displacement engine for automotive vehicles which can be shifted from the operation with all cylinders to the operation with limited number of cylinders by a cylinder number control means, a fluid coupling means interposed between the driving shaft of said variable displacement engine and the driven shaft on the side of the vehicle for carrying out the torque transmission therebetween, a direct coupling means interposed between the said driving shaft and the said driven shaft for carrying out such torque transmission without going through the said fluid coupling means, and a control unit which instructs the said cylinder number control means to change the number of the operating cylinders and decides which to select between the above two coupling means, depending on the driving states of the said variable displacement engine and of the automotive vehicle.

DETAILED DESCRIPTION OF THE INVENTION

Figure 1:
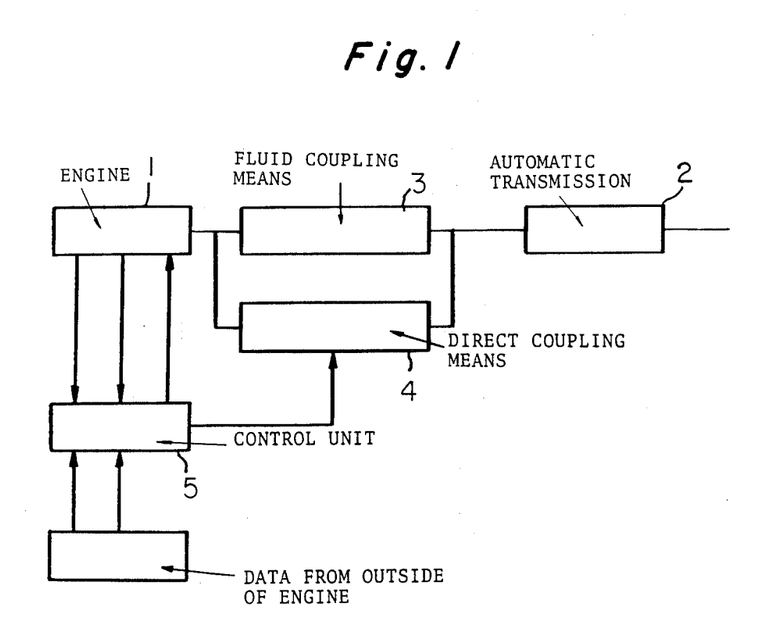
FIG. 1 is a system diagram of the driving power transmission mechanism according to the present invention.

In FIG. 1 the reference numeral 1 denotes a variable displacement engine provided with a cylinder number control means. Between the driving shaft (a crank shaft) of the engine 1 and the driven shaft of an automatic transmission 2 is provided a fluid coupling means 3 for transmission of torque therebetween. A direct coupling means 4 is also provided between the said driving shaft and the said driven shaft in order to carry out the transmission of torque therebetween without going through the said fluid coupling means 3. A coupling switching means is attached to the said direct coupling means 4 for engagement/disengagement thereof and thereby for selecting one of the said direct coupling and the fluid coupling means, 3 and 4. The reference numeral 5 denotes a control unit to receive data relating to the engine from the said variable displacement engine 1 and other data in order to control the said cylinder number control means and the said coupling switching means.

Figure 2:
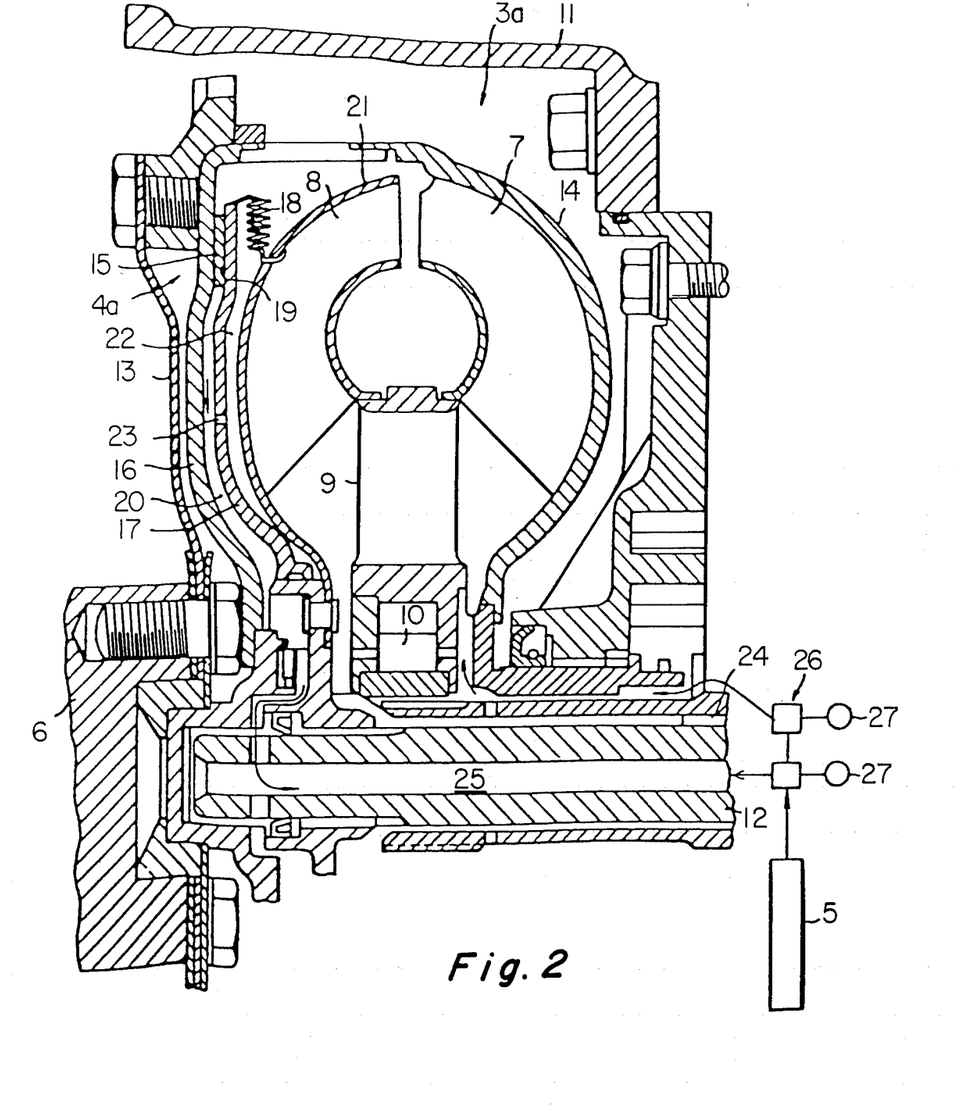
FIG. 2 is a sectional view of an embodiment of the torque transmission means.

As the torque transmission means which is provided with both a fluid coupling means 3 and a direct-type coupling means 4, any known devices such as the one disclosed in U.S. Pat. No. 3,541,893 or the one indicated in FIG. 2 may be used. The torque transmission means shown in FIG. 2 employs a torque converter 3a as the fluid coupling means and a direct-coupling clutch 4a of friction type as the direct coupling means. A pump 7 of the torque converter 3a is connected to the crank shaft 6 of the variable displacement engine in FIG. 2. The torque converter 3a comprises a pump 7 a turbine 8, a stator 9 and a one-way clutch 10 wherein the stator 9 is connected to a case 11 through the one-way clutch 10. The stator 9 is made to rotate by the one-way clutch 10 in the same direction as the crank shaft 6 and so structured as not to rotate reversely. The turbine 8 on the other hand is engaged with a drivin shaft 12 (the input shaft of the transmission 2). The direct-coupling clutch 4a is interposed between the said crank shaft 6 and the said turbine 8. The torque converter 3a and the direct-coupling clutch 4a are integrally formed and a drive plate 13 is fixed on the said crank shaft 6 to communicate with a plate 16 of the direct-coupling clutch 4a on which the outer shell 14 of the pump 7 and a friction plate 15 of the torque converter 3a are mounted. A piston 17 which forms a portion of the direct-coupling clutch 4a is engaged with said driven shaft 12 in a manner axially slidable and freely rotatable. The piston 17 and the said turbine 8 are connected via a spring 18. The spring 18 also functions to absorb shock caused at the time of actuating the direct-coupling clutch 4a. The said piston opposes the said plate 16 and has a friction surface 19 which abuts on the said friction plate 15. An oil pressure chamber 20 is formed between the piston 17 and the said plate 16 while another oil pressure chamber 22 is formed between the outer periphery of the outer shell 21 of the turbine 8 and the said piston 17. The reference numeral 23 denotes an orifice provided on the said piston 17 in order to communicate the said oil pressure chambers 20 and 22. An oil passage 24 is formed outside the said driven shaft 12, extending to the oil pressure chamber 22 via said torque converter 3a. Another oil passage 25 is formed inside the driven shaft 12, extending to the said oil pressure chamber 20. These oil passages 24 and 25 are connected to an oil supply source 27 via an oil pressure switching valve 26 which functions as the said coupling switching means. The said oil pressure switching valve 26 is controlled by the control unit 5 shown in FIG. 1. When switched on at the said oil pressure switching valve 26, the pressure oil is supplied to the oil passage 24, the torque converter 3a, the oil pressure chamber 22, the orifice 23, the oil pressure chamber 20 and the oil passage 25 in this order to move the piston 17 to the side of the plate 16 to thereby engage the direct coupling clutch 4a. When the oil flows in the direction opposite to the one mentioned above, the direct coupling clutch 4a is disengaged. The output of the variable displacement engine 1, therefore, is transmitted to the turbine 8 and further to the driven shaft 12 of the transmission 2 through either the direct coupling clutch 4a or the torque converter 3a.

Figure 3:
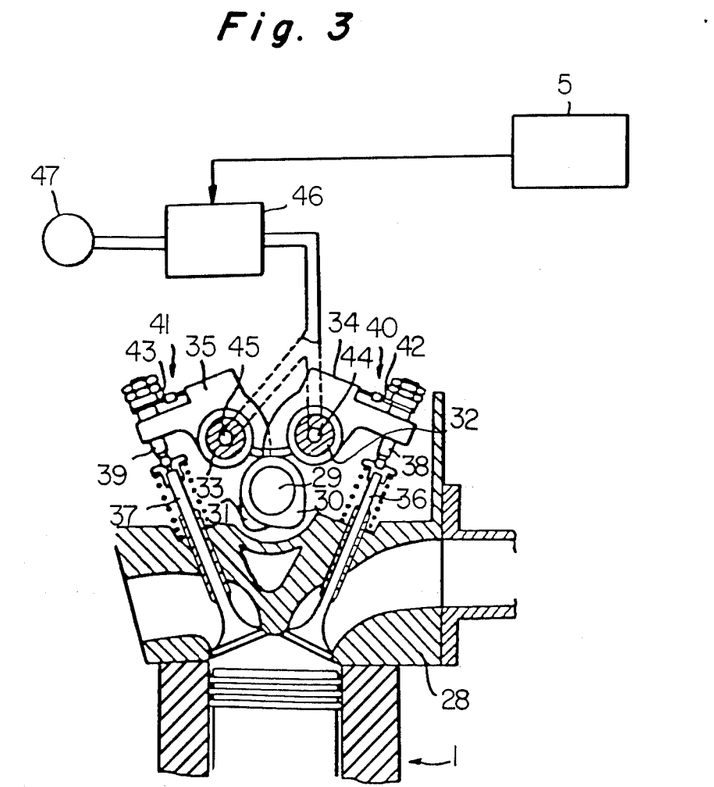
FIG. 3 is a sectional view of an embodiment of the mechanism for stopping valves.

There have been proposed various methods as the cylinder number control means such as a mechanism for stopping fuel supply to a number of cylinders, a mechanism for stopping fuel supply to a number of cylinders and simultaneously connecting the intake and exhaust passages of cylinders, a mechanism for stopping the intake/exhaust valves of a number of cylinders, etc. As an example of such devices, the mechanism for stopping valves adopted to close intake/exhaust valves of a number of cylinders is shown in FIG. 3. Cams 30, 31 for intake and exhaust are provided in a predetermined number respectively on a cam shaft 29 which is provided above a cylinder head 28 of the variable displacement engine 1 and which is driven by a crank shaft 6 of the engine 1. Rocker shafts 32, 33 which are parallel to the cam shaft 29 support in a freely swingable fashion rocker arms 34, 35 for intake and exhaust air. These rocker arms 34, 35 abut against said cams 30, 31 respectively on one end thereof. On the other end thereof are supported in a freely slidable manner plungers 38, 39 which abut either on the intake valve 36 or on the exhaust valve 37 and which is energized downward by a spring force. The valve stopping mechanisms 40, 41 are constructed so as to actuate the plungers 38, 39. The valve stopping mechanisms 40, 41 comprises an oil pressure cylinder (not shown) formed above the rocker arms 34, 35, and stoppers 42, 43 which are connected to the piston thereof and which are engaged or disengaged over the said plungers 38, 39 by the movement of the said oil pressure cylinder. When the stoppers 42, 43 are engaged with the plungers 38, 39, the movement of the plungers 38, 39 toward the rocker arms 34, 35 is prevented so that the valve opening/closing force actuated by the rotation of cam shaft 29 and cams 30, 31 is transmitted to either the intake valve 36 or the exhaust valve 37 through the plungers 38, 39. When the stoppers 42, 43 are not engaged with the plungers 38, 39, on the other hand, the movement of the plungers is allowed so that the valve opening/closing force caused by the rotation of the cam shaft 29 is not transmitted to the intake/exhaust valves 36, 37, thereby keeping those valves at the closed state. In order to actuate the said oil pressure cylinder, rocker shafts 32, 33 are formed with oil passages 44, 45 which communicate to the oil pressure cylinder. These oil passages 44, 45 are connected to the lubricant supply source 47 of the engine or the oil pressure source through an oil control valve 46, a component in the control unit. The oil control valve 46 is controlled by the control unit 5 shown in FIG. 1. More detailed structure of the valve stopping mechanism mentioned above is disclosed, for instance, in Japanese Patent Application Laid-open Sho-56-151230 (UKPA Laid-open 2075118A).

The discrimination of the driving method and of torque transmission method in the power transmission mechanism for automotive vehicles according to the present invention is carried out on the basis of data relating to the engine and otherwise. For the discrimination of the driving method, or in other words, for deciding whether the operation with all cylinders or the operation with a limited number of cylinders should be selected, the determining factors are the load on the engine, water temperature, rotation rate and such driving conditions as the switching of the range in the automatic transmission, the driving speed, etc. For the discrimination of the torque transmission method, or in other words, which to select the direct-coupling clutch or the torque converter, the determining factors are the driving speed, the engine rotation rate, oil temperature, the range switching of the automatic transmission, the opening degree of the throttle valve, the gear, whether the gear is being changed or not, etc. Those factors are input in the control unit 5 so as to select the optimal driving method and torque transmission method for the best fuel economy and the drivability.

Figure 4:
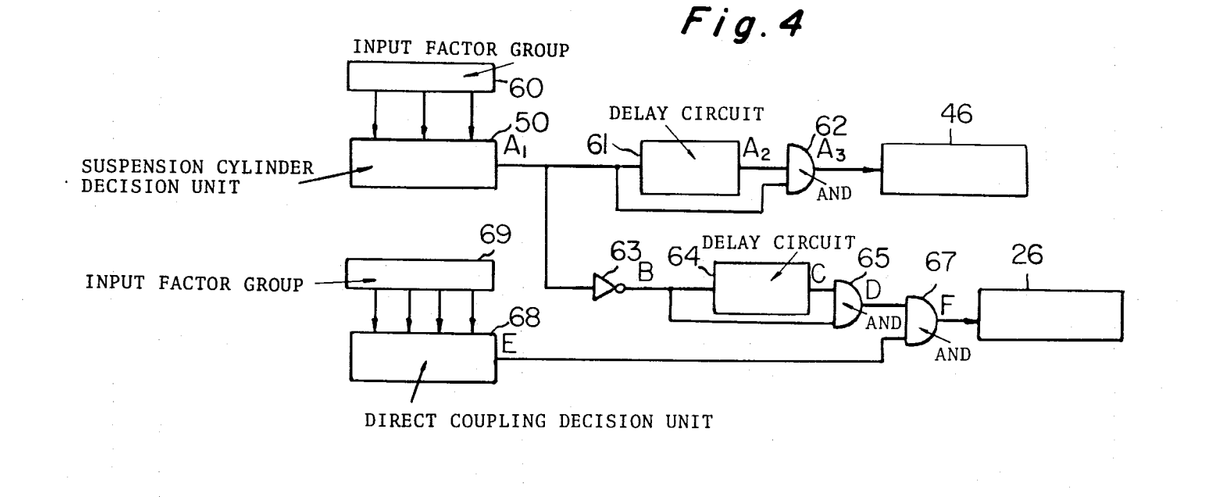
FIG. 4 is a control circuit diagram of the control unit.

In FIG. 4, the reference numeral 50 denotes the suspended cylinder discriminating unit, 60 the input factor group necessary for judging cylinders to be suspended, 61 a delay circuit, and 62 an AND circuit, wherein the output from the AND circuit 62 is made to be transmitted to a control valve 46 which is a control component to actuate the valve stopping mechanisms 40, 41 shown in FIG. 3. The reference numeral 63 denotes an inverter, 64 a delay circuit, 65 an AND circuit, 67 an AND circuit, and 26 an oil pressure switching valve shown in FIG. 2. The reference number 68 denotes a direct coupling decision unit connected to said AND circuit 67. The reference numeral 69 denotes an input factor group necessary for the direct coupling discrimination.

In this power transmission mechanism for vehicles, the engine is operated with all cylinders at the time of the high-load. Under such conditions, a direct coupling clutch 4a with a high efficiency is selected as the torque transmission means. In other words, the direct coupling decision unit 68 of the control unit 5 judges to select the direct coupling, the signal E is transmitted to actuate the oil pressure switching valve 26, and the direct coupling clutch 4a is engaged by the oil pressure. At the low-load, on the other hand, the operation with a limited number of cylinders is employed in order to save fuel. Under such an operation, since the torque changes to a greater extent and if the direct coupling method is employed, the sound in transmission gearing would be worsened, the direct coupling clutch 4a is made to disengage and the torque transmission is carried out by the torque converter 3a.

Figure 5:
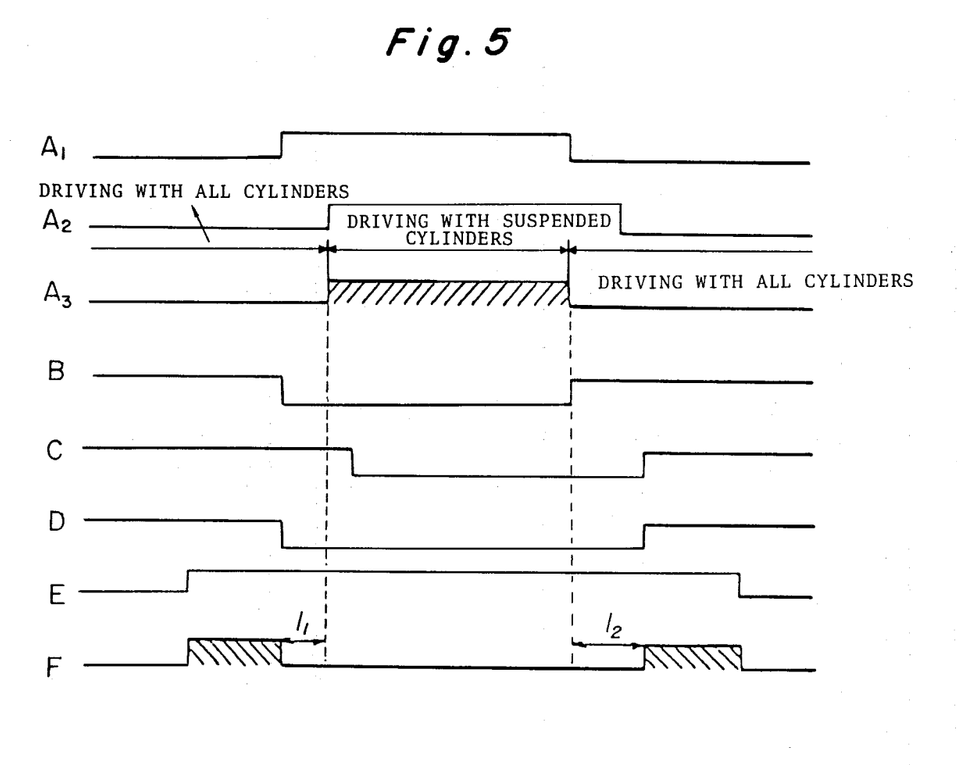
FIG. 5 is a chart to show the variation of the signals from the unit.

When the operation is switched from the one with all the cylinders to the one with a limited number of cylinders, or vice versa, if the torque transmission means is simultaneously switched from and to the direct coupling clutch 4a and the torque converter 3a, it tends to cause a great shock due to the large variation in the output. In order to avoid such, the torque transmission is made to be carried out by a torque converter at the time of switching the operational method in order to absorb shock caused thereby and to carry out such a switching smoothly. In FIG. 4 if the cylinder suspension decision unit 50 decides to suspend some of the cylinders on the basis of such input factors as the load on the engine, the water temperature, the rotation rate, etc., the cylinder suspension decision signal $A_1$ is transmitted to the delay circuit 61 where the signal $A_1$ is converted to a delay and cylinder suspension decision signal $A_2$. The signal $A_2$ further goes to the AND circuit 62 where the signals $A_1$ and $A_2$ are AND-computed to transmit the result of such computation or the cylinder suspension operation signal $A_3$ According to the signal $A_3$ the oil control valve 46 shown in FIG. 3 is actuated to actuate the valve stopping mechanisms 40, 41 with the oil pressure, thereby closing the intake valve 36 and the exhaust valve 37 of the cylinders which are selected in advance for suspension. Thus the engine is run with a certain number of cylinders suspended. The cylinder suspension decision signal $A_1$ is transmitted to the inverter 63, too, to be inverted into the inverted cylinder suspension decision signal B. The signal B further goes to the delay circuit 64 to become the inverted cylinder suspension decision signal C and further proceeds to the AND circuit 65. The AND circuit 65 carries out the AND calculation of the signal C together with the inverted cylinder suspension decision signal B to transmit the result or the signal D to the AND circuit 67. The direct coupling decision signal E obtained at the said direct coupling decision unit 68 is transmitted to the AND circuit 67, where the signal D and the signal E are AND-calculated to transmit the result of the calculation or the direct coupling clutch control signal F to the oil pressure switching valve 26 of the direct coupling clutch 4a. In short, as is evident from FIG. 5, when the operation is about to be shifted from the one with all cylinders to the one with limited cylinders (indicated by the hatched portion in $A_3$), the direct coupling operation (indicated by the hatched portion in F) is released the time $l_1$ before such a shifting; therefore the torque transmission under the operation with limited number of cylinders is carried out by a torque converter 3a which is made to be kept in operation until the time $l_2$ even after the operation with suspended cylinders has ended. The direct coupling operation starts at the time $l_2$ (as indicated by the hatched portion).

Even under the operation with suspended cylinders, the direct coupling clutch 4a is employed as the torque transmission means for a certain driving range. Such ranges may be the one where the change in output is small, for example at the time of reducing the speed, and where direct coupling would not transmit vibration to the side of the transmission. The conditions approving such ranges are, for instance, the state with the engine rotation rate, $NE > 1,500$ rpm and with the throttle closed. In such a case, there is a merit that engine brake becomes more effective due to the direct coupling. Further, it may be employed in such ranges that the output variation is small enough compared with the average output and, since the vibration and the sound from the road caused by the driving the vehicles are fairly large, even if directly coupled, the vibration of the sound caused by the suspended cylinders would not be noticed. For instance, it is employed in the range where the driving speed is 50 km/h or higher and the selected range is not in neutral. Fuel/mileage ratio can be increased.

Figure 6:
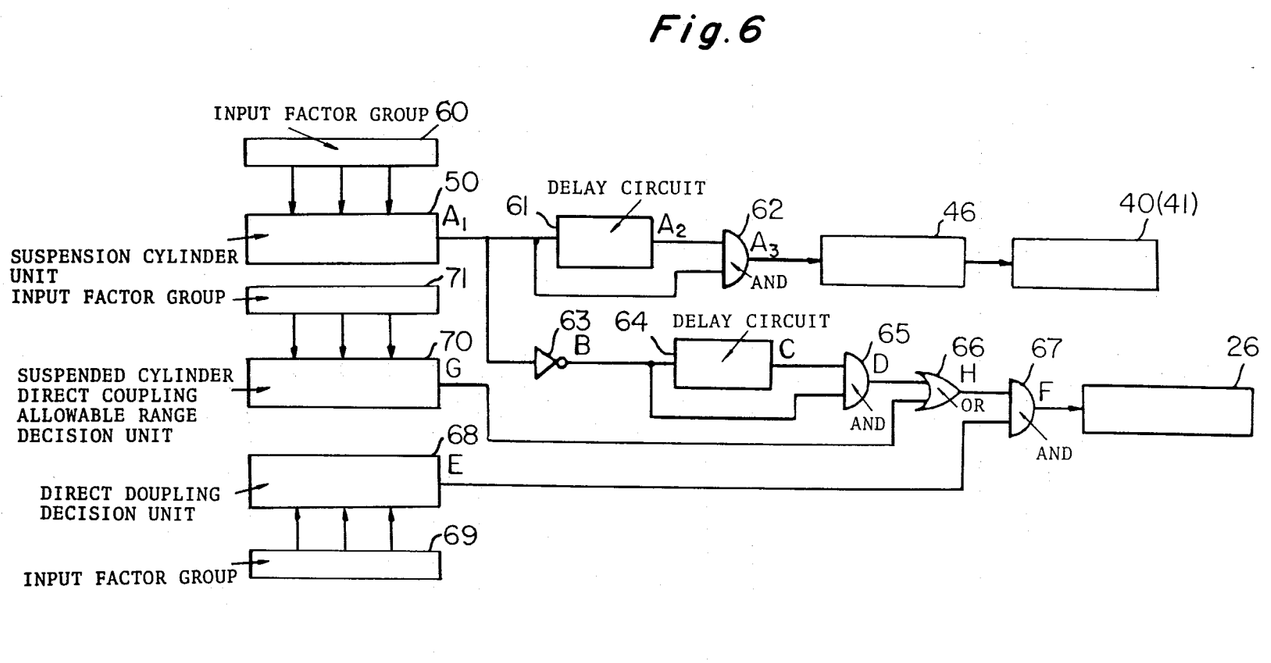
FIG. 6 is another control circuit diagram of the control unit.
Figure 7:
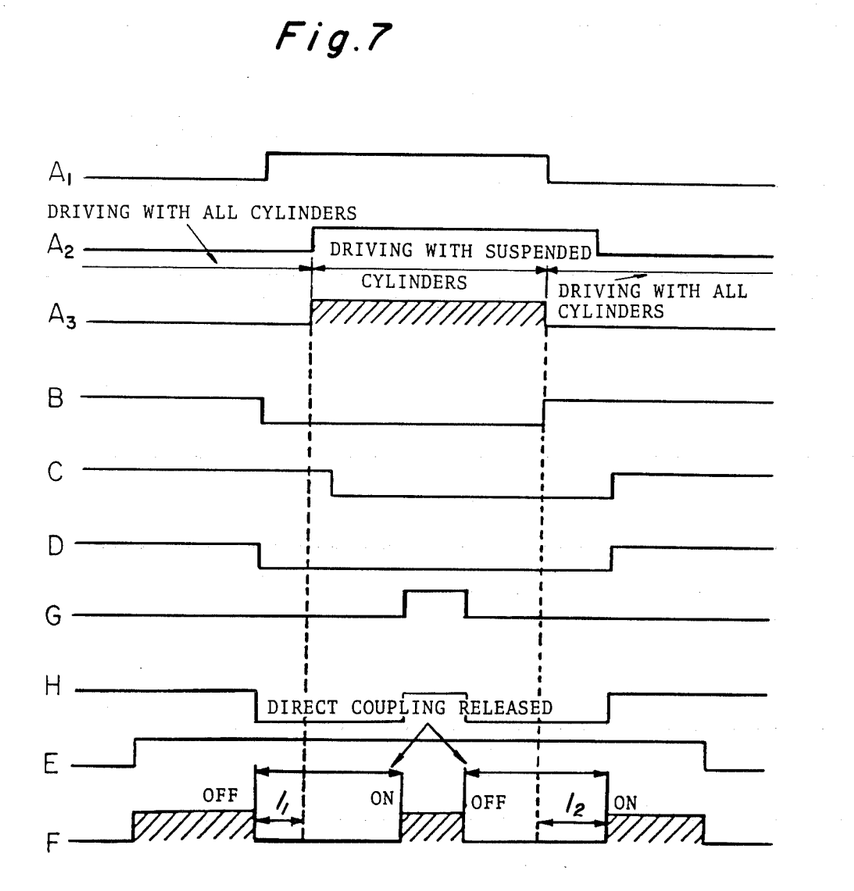
FIG. 7 is a chart to show the variation of signals therefrom.

As shown in FIG. 6, the control circuit in the control unit 5 for the aforementioned control comprises the control circuit of FIG. 4 which is further provided with an OR circuit 66 between the AND circuit 65 and the AND circuit 67 and the suspended cylinder direct coupling allowable range decision unit 70 which is connected to the circuit 66 to calculate the signal D from the AND circuit 65 and the signal G from the said decision unit 70. The reference numeral 71 denotes an input factor group necessary for the suspension cylinder direct coupling allowable range decision. The direct coupling range under the operation with limited number of cylinders is decided at the said suspended cylinder direct coupling allowable range decision unit and the resulting signal G is transmitted to the said OR circuit 66. From the OR circuit 66 is obtained a direct coupling instruction signal H during the operation with suspended cylinders to be transmitted to the oil pressure switching valve 26 via the AND circuit 67 to switch on the direct coupling clutch 4a with the oil pressure. The direct coupling range under such an operation is indicated by a hatched portion in FIG. 7. This operation range is usually far from the range for switching from and to the operation with all cylinders and the one with limited number of cylinders.

The power transmission mechanism for automotive vehicle according to the present invention may be operable under other operational modes than the one mentioned above. The torque converter 3a may be employed as the torque transmission means for a range under the operation with all cylinders other than the above mentioned one while the direct coupling clutch 4a is used for the remaining ranges.

Although a delay circuit is used as the delay means in the control unit in the embodiment mentioned above so that a fluid coupling means is used at the time of switching between the all cylinder operation and the cylinder suspended operation, an operational map of the vehicle (including the engine) may be prepared in advance to be stored in a computer, whereby an instruction for switching operation is obtained for each range and a fluid coupling means may be selected for driving range including such a range. For constructing respective decision units, they may be processed by one computer instead of individual arrangement.

As is obvious from the foregoing, the power transmission mechanism according to the present invention can improve the fuel/mileage ratio by selecting the optimal number of cylinders in operation and the optimal torque transmission means of a variable displacement engine to best fit the driving state of the variable displacement engine and the automotive vehicle. When the operation is switched between the one with all cylinders and the one with suspended cylinders, a fluid coupling means is used to carry out the torque transmission, thereby absorbing the shock caused by such a shifting for smooth switching.

What we claim:

1. A power transmission mechanism for automative vehicles comprising a variable displacement engine which can be selectively placed in a first operation mode in which all of the cylinders are active and a second operation mode in which selected ones of the cylinders are only active, under control of number-ofcylinder control means including means for changing over the number of active cylinders, fluid coupling means disposed between a driving shaft of said variable displacement engine and a driven shaft in a vehicle for effecting torque transmission between said driving shaft and said driven shaft, direct coupling means disposed between said driving shaft and said driven shaft for effecting torque transmission between said driving shaft and said driven shaft in a relation functionally parallel to the torque transmission through said fluid coupling means, suspension cylinder determining means for generating and applying a command signal commanding change-over of the number of active cylinders to said number-of-cylinder control means so as to place said variable displacement engine in one of said first operation mode and said second operation mode depending on the operating conditions of at least one of said engine and said vehicle, and coupling change-over means operative in response to the command signal generated from said suspension cylinder determining means for selectively effecting the torque transmission through said fluid coupling means and said direct coupling means, said coupling change-over means operating so that the torque transmission between said driving shaft and said driven shaft is effected through said fluid coupling means during change-over of the number of active cylinders and during the operation of said engine of said second operation mode under command of the command signal generated from said suspension cylinder determining means.

2. A power transmission mechanism as claimed in claim 1, further comprising means for determining an operation range permitting operation of said direct coupling means when said variable displacement engine operates in said second operation mode in which the selected ones of the cylinders are only active, said operation-range determining means detecting a specific operating condition of said variable displacement engine when said engine is operating in said second operation mode and applying a direct-coupling permission signal to said coupling change-over means, so that said direct coupling means is permitted to operate prior to the operation of said suspension cylinder determining means.

3. A power transmission mechanism as claimed in claim 2, wherein said specific operating condition is an operating condition in which the rotation speed of said variable displacement engine is higher than a setting, and the throttle valve in said engine is full closed.

4. A power transmission mechanism as claimed in claim 2, wherein said specific operating condition is an operating condition in which the speed of the vehicle is higher than a setting, and the transmission having said driven shaft is shifted to a position other than its neutral position.

5. A power transmission mechanism for automotive vehicles comprising a variable displacement engine which can be selectively placed in a first operation mode in which all of the cylinders are active and a second operation mode in which selected ones of the cylinders are only active, under control of number-of-cylinder control means including means for changing over the number of active cylinders, fluid coupling means disposed between a driving shaft of said variable displacement engine and a driven shaft in a vehicle for effecting torque transmission between said driving shaft and said driven shaft, direct coupling means disposed between said driving shaft and said driven shaft for effecting torque transmission between said driving shaft and said driven shaft in a relation functionally parallel to the torque transmission through said fluid coupling means, suspension cylinder determining means for generating and applying a command signal commanding the number of active cylinders to said number-of-cylinder control means so as to place said variable displacement engine in one of said first operation mode and said second operation mode depending on the operating conditions of at least one of said engine and said vehicle, coupling change-over means operative in response to the command signal generated from said suspension cylinder determining means for selectively actuating said direct coupling means in said first operation mode and selectively actuating said fluid coupling means in said second operation mode, first delaying means for delaying transmission to said number-of-cylinder control means of a change-over command signal generated from said suspension cylinder determining means to command change-over from said first operation mode to said second operation mode, and second delaying means for delaying transmission to said coupling change-over means of a change-over command signal generated from said suspension cylinder determining means to command change-over from said second operation mode to said first operation mode, said coupling change-over means operating so that the torque transmission between said driving shaft and said driven shaft is effected through said fluid coupling means during change-over of the number of active cylinders under command of the command signal generated from said suspension cylinder determining means.

* * * * *